(12) United States Patent
Ramotowski

(10) Patent No.: US 8,518,495 B1
(45) Date of Patent: Aug. 27, 2013

(54) SUPERHYDROPHILIC COATINGS FOR IMPROVED SONOBUOY PERFORMANCE

(75) Inventor: Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 206 days.

(21) Appl. No.: 13/158,972

(22) Filed: Jun. 13, 2011

(51) Int. Cl.
*B05D 1/02* (2006.01)
*B05D 1/18* (2006.01)

(52) U.S. Cl.
USPC ............... 427/421.1; 427/429; 427/430.1

(58) Field of Classification Search
USPC .................... 427/421.1, 429, 430.1
See application file for complete search history.

(56) References Cited

U.S. PATENT DOCUMENTS

| | | | |
|---|---|---|---|
| 265,384 | A | 10/1882 | Chappin |
| 4,700,100 | A | 10/1987 | Congdon |
| 6,013,372 | A | 1/2000 | Hayakawa |
| 6,532,835 | B1 | 3/2003 | Saaski |
| 7,294,365 | B2 | 11/2007 | Hayakawa |
| 2003/0096083 | A1 | 5/2003 | Morgan |
| 2005/0019700 | A1* | 1/2005 | Hayakawa et al. ........... 430/311 |
| 2007/0104922 | A1 | 5/2007 | Zhai |
| 2007/0166513 | A1 | 7/2007 | Sheng |
| 2008/0268229 | A1 | 10/2008 | Lee |

OTHER PUBLICATIONS

Feng et al., "Eliminating Unwanted Nanobubbles from Hydrophobic Solid/Liquid Interfaces: A Case Study Using Magnetoelastic Sensors", Jan. 15, 2008, American Chemical Society, p. 1.*
Ganjoo et al., "Persistent Superhydrophilicity of Sol-gel Derived Nanoporous Silica Thin Films", Dec. 18, 2008, Journal of Physics D: Applied Physics, pp. 1-2.*

* cited by examiner

*Primary Examiner* — Frederick Parker
*Assistant Examiner* — Ann Disarro
(74) *Attorney, Agent, or Firm* — James M. Kasischke; Michael P. Stanley; Jean-Paul A. Nasser

(57) ABSTRACT

A method is provided for applying a superhydrophilic coating to a surface of a sonobuoy and acoustic sensors. A variety of different processed and chemistries can be used to make superhydrophilic coatings including polyethylene glycol, titanium dioxide and nanoporous silica. Application to the surface can be by dipping, painting and spraying. Once applied to the outer surface of the acoustic sensor and specifically the sonobuoy, the sonobuoy can be handled/stored/deployed under existing procedures. Titanium dioxide and nanoporous silica are inorganic materials that would have to be inter-mixed with the coating. The coating allows a surface of the sonobuoy to wet completely upon immersion into a fluid thereby minimizing the formation of air bubbles on the surface whereby the suppression of bubble formation allows the sonobuoy to immediately generate high quality acoustic data.

2 Claims, 2 Drawing Sheets

SUPERHYDROPHILIC COATINGS FOR IMPROVED SONOBUOY PERFORMANCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1) Field of the Invention

The present invention is a system and method of use to improve the performance of sonobuoys and other acoustic sensors that can be dropped and then can properly operate upon entry into the ocean. This improved performance can also be used with acoustic sensors that are periodically lowered into the ocean in which the sensors are used to find underwater targets. The method comprises coating such devices with superhydrophilic coatings. The coating allows acoustic surfaces to "wet" completely and immediately upon immersion; thereby, preventing or minimizing the formation of air bubbles on the surface of a device with acoustic sensors. The suppression of bubble formation allows the acoustic sensors to immediately generate high quality acoustic data.

2) Description of Prior Art

Air cavities/bubbles are detrimental to acoustic sensors because the cavities/bubbles scatter and reflect acoustic waves. As shown in FIG. 1, an acoustic sensor 50 is set in an ocean environment 10. In the figure, the acoustic sensor 50 has a rubber coating 60 where cavities or bubbles 80 form upon immersion. Thus, a typical sensor or an air-dropped device like a sonobuoy cannot operate effectively until the air cavities/bubbles surrounding the device have significantly dissipated.

There are varying ways to make coatings that exhibit superhydrophilicity water/air contact angles in which the angles are essentially zero. Superhydrophilic surfaces exhibit perfect wetting when the surfaces are immersed such that essentially no air bubbles will form on such surfaces when the surfaces are immersed. If drops of water are placed on a surface, the drops will immediately flatten out to coat the surface evenly with water. This effect is the exact opposite of superhydrophobicity.

Superhydrophobicity has the requirement of a hydrophobic surface with a special geometry/roughness that forms a very thin layer of trapped air on the surface. This is opposite of what is preferred because air layers are very good sound reflectors/scatterors. Instead, it is preferred to have a superhydrophilic surface in which the water is in intimate contact with the surface so that there are no trapped air bubbles to interfere with the acoustic sensing. To make a superhydrophilic surface, the surface roughness is not critical; but to make a superhydrophobic surface then the correct degree of surface roughness is crucial.

The known art for coatings used on air-dropped/deployed acoustic sensors (e.g., sonobuoys) is to coat such devices with an acoustically-transparent elastomer that is neither superhydrophilic nor superhydrophobic. Because of this coating, as soon as the device makes contact with the water, air bubbles form both on the surface of the device and in the vicinity of the device (due to the "splash" of entry).

The air bubbles get trapped by irregularities on the surface and on surface materials that do not wet well. Traditionally, a wash of detergent is applied to the rubber face of an acoustic sensor to minimize these irregularities by cleaning the surface and by lowering surface tension. The air bubbles are undesirable for acoustic sensing—mainly because the bubbles reflect and scatter acoustic waves. Thus, for a period of time after the sensor enters the water, the acoustic sensor is unable to function properly.

The reason for improper functioning is that the sensor cannot obtain some acoustic signals until the cloud of air bubbles that formed dissipates. In addition, air bubbles formed during water entry may persist and cling to the sensor surface for a period of time. This formation further interferes with the reception of the acoustic signals.

Normally, good wetting results from high surface energy surfaces. The energy of the surface helps drops of water spread out into a thin film on the surface. A low energy surface tends to make the water drops bead up because the surface tension of the water exceeds the surface energy and the water molecules can draw themselves into three-dimensional droplets. The surface energy of a surface depends chemistry (what atoms/molecules are exposed at the surface) and somewhat on the fine-scale structure of the surface. Of course, if there are low surface energy contaminants present on the surface; there will be incomplete wetting. Clearly, it is desirable for air-dropped sensors to generate an air bubble cloud that is as small as possible and to optimally prevent air bubbles from forming on and/or clinging to acoustic surfaces.

Superhydrophilic coatings provide an ideal means for addressing these problems. Primarily, a superhydrophilic coated acoustic window/surface will wet completely and immediately upon entry into the water. Bubbles will not form on this surface, nor will air bubbles form elsewhere to attach and stick to such surfaces. Thus, an acoustic sensor coated with superhydrophilic compounds will be able to work immediately upon entry into the water; thereby, minimizing the chances of losing contact with a target while waiting for air bubbles to dissipate.

In regard to the prior art, the Capron reference (United States Publication Serial No. 2008/0199657) does not address superhydrophilicity and instead the section gives a well-known definition for superhydrophobicity. Superhydrophobicity includes the requirement of a hydrophobic surface with a special geometry/roughness that forms a very thin layer of trapped air right on the surface. This is the exact opposite of what is the intent of the invention described below because air layers are too good as sound reflectors/scatterers. This definition implies that the liquid matches the roughness of the surface.

In general, superhydrophilic surfaces have a high surface energy that pulls a liquid drop flat onto the surface. The chemistry of the surface is important for this effect; yet, that is not mentioned in the cited reference. Furthermore, paragraph [0026] of the Capron reference describes some surface chemistries that could be used to make a superhydrophilic surface.

Paragraph [0030] of the Capron reference simply indicates that the superhydrophobic or superhydrophilic materials will be deposited as a coating on another surface. Paragraph [0057] includes a description of what kind of contact angle would be expected from a water drop on a superhydrophilic surface. This concept is known in the art.

The reference further discloses a product having superhydrophilic or superhydrophobic surface having physical properties with a substrate coated on a surface with a structuring layer added on to the surface and with a film deposited on the layer. The film is continuous, and the physical properties of the surface are conferred by the nature of the film, the surface of the layer and with the deposited film having roughness with nanometric-size dimensions. This is how the cited reference makes superhydrophobic or superhydrophilic surfaces. The Capron reference only details the surface roughness of the coating/film—the surface roughness is more important for superhydrophobic surfaces. One does not need to focus on surface roughness to make a superhydrophilic surface.

SUMMARY OF THE INVENTION

Accordingly, it is a primary object and general purpose of the present invention to provide a system and method for applying a superhydrophilic coating to a surface.

The present invention provides a system and a method for improving the performance of sonobuoys by coating the sonobuoy surface with superhydrophilic coatings. A variety of different processed and chemistries can be used to make superhydrophilic coatings. Some examples include: polyethylene glycol (PEG); titanium dioxide; and nanoporous silica. Such coatings have been shown to minimize and even eliminate the air cavity that forms when a device is dropped into water.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein.

DETAILED DESCRIPTION OF THE INVENTION

The present invention is a system and method of use for coating the outer surface of a hydrodynamically streamlined, air-dropped acoustic sensor with a superhydrophilic compound. A variety of different processed and chemistries can be used to make superhydrophilic coatings—any one of these can be used as the coating envisioned by the present disclosure. These coatings exhibit water contact angles close to zero degrees. Some examples include: polyethylene glycol (PEG); titanium dioxide; and nanoporous silica.

Figure 1:
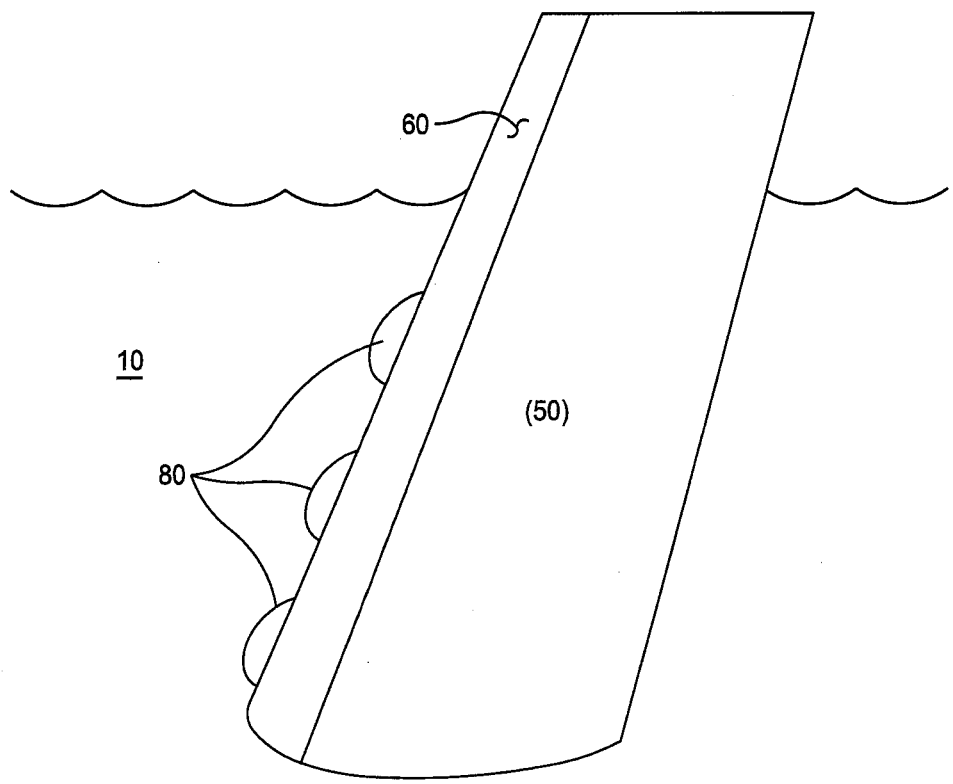
FIG. 1 depicts a prior art situation where air bubbles are generated on the surface of an acoustic sensor.
Figure 2:
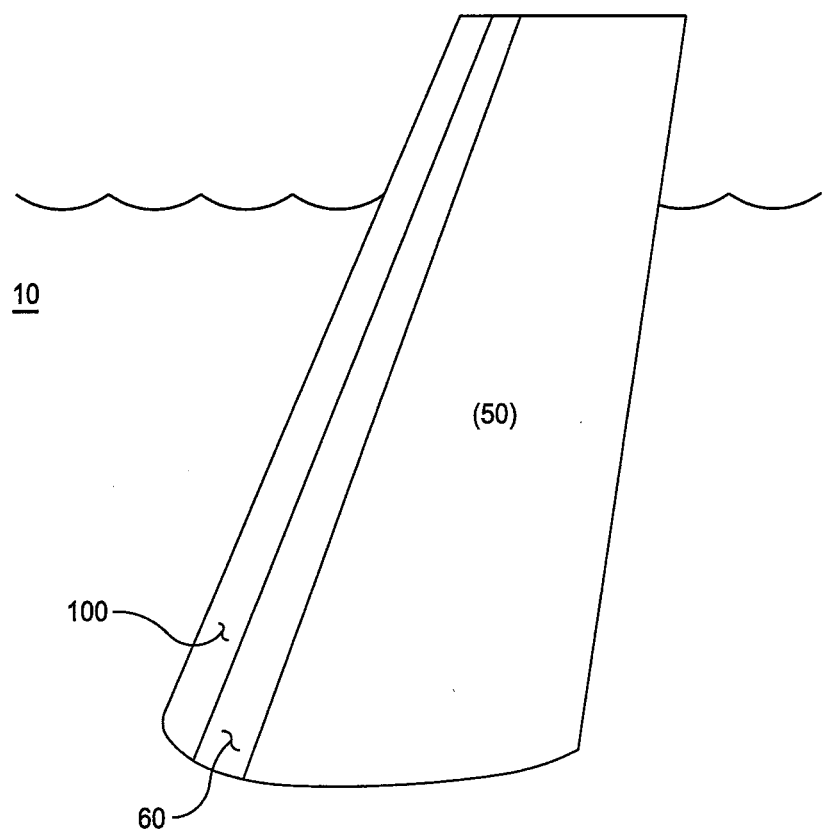
FIG. 2 depicts a situation where the superhydrophilic coating of the present invention is present to prevent the generation of air bubbles on the surface of an acoustic sensor.

Application to the surface can be by dipping or painting (PEG) or possibly even by spraying. The coated acoustic sensor 50 is shown in FIG. 2. In the figure, the acoustic sensor 50 has a superhydrophilic coating 100 applied to the rubber portion 60.

Once applied to the outer surface of the acoustic sensor, the sensor can be handled/stored/deployed under existing procedures. Titanium dioxide and nanoporous silica are inorganic materials that would have to be inter-mixed with a coating.

Because superhydrophilicity is essentially a surface phenomenon; the thickness of the applied superhydrophilic coating does not have to be significant. Since the coatings will not be comparatively thick and can be made from polymers exhibiting close acoustic impedance matches with seawater; the presence of such coatings on acoustic surfaces will not adversely affect the reception/transmission of sound through such surfaces.

Once a coated device enters the water, the surface of the device will wet immediately and completely; thereby, allowing acoustic data to be collected as soon as the device enters the water. This immediate action prevents the formation of signal-degrading air bubbles on the acoustic surface of the device (sensor).

More specifically, the "splash" generated by air-dropped acoustic sensors entering the water is minimized or sometimes eliminated by the presence of superhydrophilic coatings. Because the "splash" is minimized or even eliminated, there are significantly fewer air bubbles surrounding the sensor when the sensor initially enters the water. This allows the sensor to begin receiving acoustic data earlier in a mission. This in turn minimizes the chances of the target being "lost" while waiting for the initial entry air bubble cloud to clear. The coating method of this disclosure allows underwater targets to be detected sooner during the mission profile. Furthermore, because the superhydrophilic surfaces greatly reduce the splash associated with the entry of the devices into the water suggests that such coatings could be also used to disguise the entry of such devices.

Many different kinds of polymer coatings/chemistries can be used to generate the superhydrophilic surfaces needed. The coatings contemplated could be applied to acoustic sensors on other Navy platforms that periodically surface/submerge (e.g., submarines, UUVs, airborne "dipping" sonars); thereby, imparting the same advantages to those systems.

This disclosure now includes some specific chemistries that could be used for the film/coating that would render the coated surface to be superhydrophilic. These are not only the materials that could be used to make such surfaces. It does not matter to the implementation of the system and method of the present disclosure as to what the chemical composition of the superhydrophilic coating is, as long as the coating will bond to the underlying surface (typically some type of rubber).

Comparing the present invention to the prior art, the Capron reference (United States Publication Serial No. 2008/0199657) is directed towards the making of a superhydrophobic or superhydrophilic surface. The cited reference does not disclose possible uses for such surfaces, and therefore does not disclose the use with sonobuoys.

The Capron reference also does not address superhydrophilicity and instead gives a well-known definition for superhydrophobicity. This definition implies that the liquid matches the roughness of the surface. In general, superhydrophilic surfaces have a high surface energy that pulls a liquid drop flat onto the surface. The chemistry of the surface is important for this effect; yet, that is not mentioned in the cited reference.

Capron also discloses a product having superhydrophilic or superhydrophobic surface face physical properties with a substrate coated on a surface with a structuring layer added on to the surface and with a film deposited on the layer. The film is continuous, and the physical properties of the surface are conferred by the nature of the film, the surface of the layer and with the deposited film having roughness with nanometric-size dimensions. This is how the cited reference makes superhydrophobic or superhydrophilic surfaces. The Capron reference only details the surface roughness of the coating/film—the surface roughness is more important for superhydrophobic surfaces. One does not need to focus on surface roughness to make a superhydrophilic surface.

A superhydrophilic-coated sonobuoy could begin to operate immediately upon entry into the water. As such, there is less of an opportunity for the device to lose a sonar contact that the device intended to acquire. In addition, superhydrophilic coatings do not support the surface formation of air bubbles. This condition eliminates signal degradation for hydrophones and other acoustic sensors that may have air bubbles trapped on their surfaces/outer coatings when the parent platform of the device submerges. It is not highly relevant to the present invention how that surface is produced or the chemistry of the surface.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of use for a superhydrophilic surface coating on an acoustic sensor used in an ocean environment, said method comprising the steps of:

applying a layer of the superhydrophilic coating to an outer surface of the acoustic sensor; and allowing the surface of the acoustic sensor to wet completely upon immersion into the ocean environment thereby minimizing the formation of air bubbles on the outer surface whereby the suppression of bubble formation by the superhydrophilic coating allows the acoustic sensor to generate quality acoustic data.

2. A method of use for a superhydrophilic surface coating on a sonobuoy used in an ocean environment, said method comprising the steps of:

applying a layer of the superhydrophilic coating to an outer surface of the sonobuoy; and allowing the surface of the sonobuoy to wet completely upon immersion into the ocean environment thereby minimizing the formation of air bubbles on the outer surface whereby the suppression of bubble formation by the superhydrophilic coating allows the sonobuoy to generate quality acoustic data.

* * * * *